Oct. 24, 1950     F. D. MATRAS     2,527,437
FISHING BOBBER
Filed Sept. 26, 1949
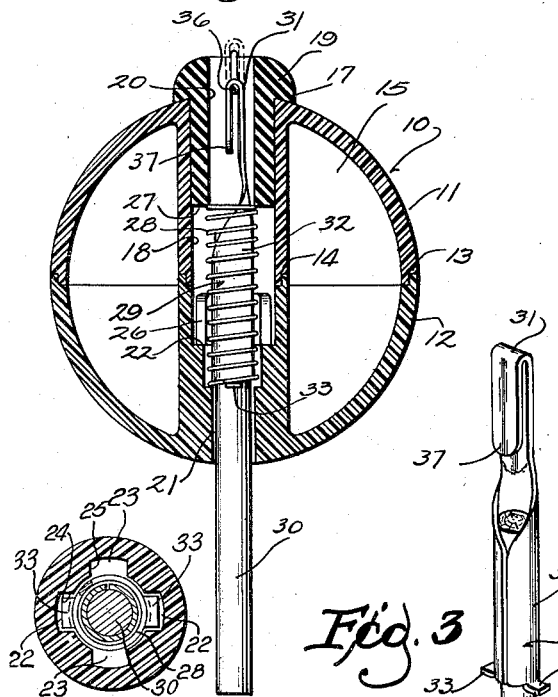
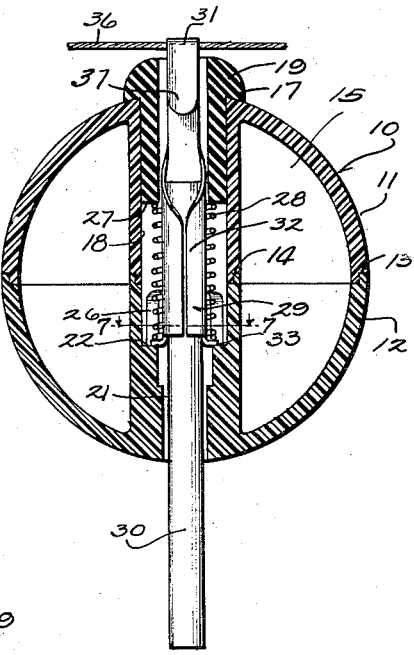
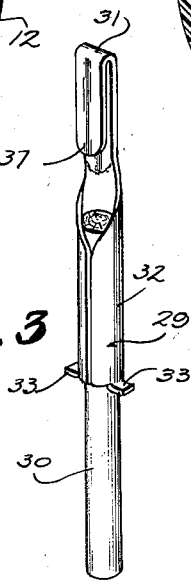
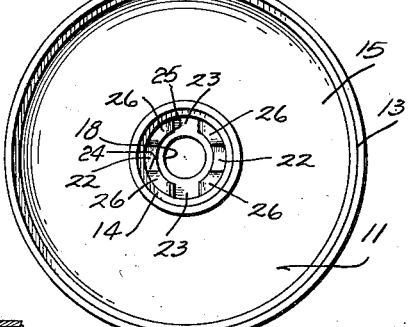
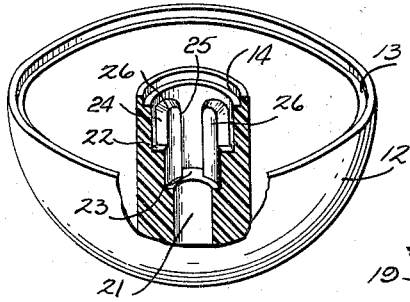
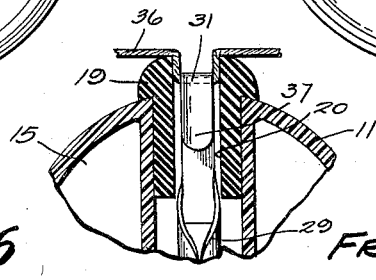
INVENTOR
FRANK D. MATRAS
BY Wheeler, Wheeler & Wheeler
ATTORNEYS Patented Oct. 24, 1950

2,527,437

UNITED STATES PATENT OFFICE 2,527,437

FISHING BOBBER

Frank D. Matras, Milwaukee, Wis., assignor to Frabill Manufacturing Company, Milwaukee, Wis., a corporation of Wisconsin Application September 26, 1949, Serial No. 117,785

11 Claims. (Cl. 43—44.87)

This invention relates to improvements in fishing bobbers.

It is the principal object of the invention to provide a fishing bobber which may be freely adjusted along a fish line and which may be securely held in any selected position therealong.

It is an object of the invention to provide a fishing bobber having a fish line engaging member which is adjustable within the bobber to a position where the line may be freely engaged and disengaged therewith, which is further adjustable to another position where the line is firmly held in a fixed position with respect to the bobber, and which is still further adjustable to an intermediate position wherein the line is free to slip with respect to the bobber but is restrained from disengagement therefrom.

Another object of the invention is to provide a fishing bobber having these adjustable features with means for firmly positioning the line engaging member in its selected line fixing and intermediate line slipping positions whereby inadvertent release from said selected position is restrained.

It is a further object of the invention to provide a fishing bobber having a hooked member so adjustable with respect to the bobber float as to be retractable into the bobber in selective steps defining the projected, intermediate and retracted positions of the hooked member.

Other objects will be more apparent from an examination of the following disclosure.

In the drawings:

Fig. 1 is an axial cross section through the bobber float showing the adjustable member in side elevation with its line engaging hook fully retracted into the float bore.

Fig. 2 is an axial cross section through the bobber float at right angles to Fig. 1 showing an intermediate position of the adjustable member wherein the bight of the hook extends free of the float bore.

Fig. 3 is a perspective view of the adjustable member shown disassociated from the bobber.

Fig. 4 is a plan view of the hemispherical float section containing the stepped thrust block.

Fig. 5 is a perspective view of the hemispherical float section containing the stepped thrust block, with portions broken away to show details of construction.

Fig. 6 is a fragmentary view of the apertured plug showing the manner of binding the line thereagainst when the hooked member is fully retracted.

Fig. 7 is an enlarged horizontal cross sectional view taken through the thrust block structure on the line 7—7 of Fig. 2.

The fishing bobber comprises a buoyant float indicated generally as 10, and which comprises, in the preferred embodiment, mating hemispherical sections 11 and 12 which may be made of plastic or like material and cemented together or otherwise joined along concentric mating lap joints 13 and 14. The two sections have hollow interiors which form an air chamber 15 within the float to give it buoyancy when the sections are joined in air tight relationship. The spherical air chamber construction of the float is illustrated merely by way of exemplification, as it will be apparent that any other buoyant float, such as cork or wool or the like would serve the purpose.

The float 10 is provided with an axial bore 18 which is partially closed at one end by an apertured plug 19, which is made of rubber or other resilient material to be frictionally bound against the bore 18 and to provide yielding line engaging surfaces. The plug is further provided with an overlapping flange 17 to position the plug within the bore. The plug 19 is provided with an aperture or bore 20 within which the line engaging hook 31 is normally retracted. The end of bore 18 remote from the plug 19 is restricted in diameter to provide a bore 21 of approximately the same diameter as bore 20 and is axially aligned therewith.

The bore 18 is provided with a thrust block integral with hemisphere 12 comprising a series of paired shoulders or steps 22 and 23 projecting from the walls of the bore 18 toward its central axis, the respective steps comprising each pair being disposed diametrically opposite each other. The respective pairs of steps are spaced axially of the bore between the apertured plug 19 and restricted bore 21. The pairs of steps 22 and 23 are arcuately displaced from each other by 90° and are separated by guide-ways or ribs 26 projecting from the bore walls toward the bore axis to the same extent as the respective steps 22 and 23. As best shown in Fig. 5 the guide ways 26 have axially and laterally extending guide sufaces or sides of different lengths, 24 and 25, which join the respective steps 22 and 23 to form an inner embossment on the bore walls of turret form having parapets at different levels.

The space between the inner edge 27 of the apertured plug 19 and the stepped thrust block comprises a spring chamber housing a compression spring 28 which encircles an adjustable member, indicated generally as 29, which is reciprocable in the aligned bores 20 and 21. The member 29 comprises an operating stem 30 carrying a pressed fitting 32 at the end of which is formed an integral hook 31. The hook has line engaging portions of rounded concavo-convex form through which the line may readily slip when the hook is projected from the bore of the plug 19. The fitting 32 is further provided at one end with transverse detent projections or flanges 33 which are disposed at diametrically opposite sides of the fitting 32. The detents 33 are adapted to selectively seat against the selected respective paired steps 22 or 23 under the bias of spring 28 which is compressed between the plug and the detents. The spring bias is such as to oppose projection of the hook 31 out of its retracted position within the apertured plug 19 and firmly hold the adjustable hooked member in selected position.

Axial manipulation of the adjustable member 29 and rotation thereof through 90° within the float bore will serve to selectively engage its detents 33 with the respective oppositely disposed paired steps 22 or 23 as desired. During such axial and rotational manipulation of the member 29 the side margins of the detents 33 will be guided by sliding contact thereof with the side walls of the guideways 26. The guide ways likewise prevent rotation of the member 29 after the detents have been selectively disposed against the steps 22 or 23.

When it is desired to selectively dispose the hook 31 in a fully retracted position within the bore, as shown in Fig. 1, the member 29 is manipulated to engage the detents 33 with the steps 23. The hook may be fully projected to a completely exposed position by completely compressing the spring 28. If desired the hook may be returned to the intermediate position shown in Fig. 2 by rotating the member 29 through 90° and permitting the spring to expand to contact detents 33 with the steps 22. In order to shift the member 29 from the intermediate position to its fully retracted position it is necessary to compress the spring far enough to clear the detents 33 over the ends of the guide ribs 26 before the member can be rotated preparatory to retraction.

A fish line 36 may be strung through the hook 31 and will be frictionally bound against the inner apertured wall of the plug 19 when the hook is fully retracted within the bore as shown in Figs. 1 and 6. In this position the bobber is fixed with respect to the line. The hook 31 may be projected completely free of the plug so as to expose the free end 37 of the hook 31 to permit the line to be freely engaged or disengaged from the hook. When it is desired merely to shift the position of the bobber on the line the adjustable member may be manipulated to the intermediate position shown in Fig. 2 whereby the hook is only partially retracted. The bight of the hook projects in this position free of the apertured plug 19 to permit the line to be slipped through the hook 31 so that the bobber may be shifted to a new position on the line. During this movement, however, the end 37 of the hook is retracted within the bore of the apertured plug so that the line cannot become inadvertently disengaged from the hook. In this manner the bobber may be conveniently positioned upon the line to accommodate different depths to which the fish hook is to be immersed in the water.

From the foregoing description taken in connection with the accompanying drawings it is seen that a fishing bobber is provided which is adjustable along the fish line and which has an operating member carrying a line engaging hook which may be fully retracted within this bobber to hold the line fast against the float at any desired point on the line. The hooked member may be fully projected from the bobber to permit the line to be detached therefrom and may be retracted to an intermediate position permitting the line to be slid through the hook but not permitting the line to become inadvertently disengaged therefrom. The float is provided with a stepped thrust block construction which cooperates with the adjustable member to hold it in the selected retracted or intermediate positions.

I claim:

1. In a fishing bobber, the combination with a float having an internal bore and steps projecting into the bore and spaced axially of the bore, of a hooked member movable in the bore having an operating stem having an end projecting from one end of the bore and the other end of the stem carrying the hook, said member having a detent selectively engageable with said steps, and resilient means acting on the member for retracting the hook into the bore to an extent determined by the selected engagement of the detent with the respective steps.

2. In a fishing bobber, the combination with a float having an internal bore, a thrust block in the bore comprising a plurality of steps spaced axially of the bore and a shoulder in the bore spaced from the steps to form a spring housing chamber, of an adjustable member movable in the bore and having one end projecting from one end of the bore and the other end of said member carrying a hook, said member having a detent engageable selectively with the axially spaced steps of the thrust block, a spring housed in said chamber and acting between said shoulder toward said steps to resiliently retract the hook into the bore to an extent determined by the selected engagement of the detent with the selected step.

3. In a fishing bobber the combination with a float having an internal bore, an apertured plug in one end of the bore and a series of steps projecting into the bore spaced axially from the plug and from each other, the space between the apertured plug and the several steps comprising a spring chamber, an adjustable member axially movable in the bore and having an end projecting from one end of the bore, the other end of the member being provided with a hook retractible into the plug aperture, said member having a detent selectively engageable with the respective steps, and a compression spring disposed within the spring chamber with one end bearing against the apertured plug and the other end bearing against the detent whereby to bias the stem against projection of its hooked end from the apertured plug, and toward the steps, said hooked end being adapted to be selectively positioned at different positions relative to the apertured plug dependent upon the selected engagement of the detent with the steps.

4. The device of claim 3 wherein the axially spaced steps are arcuately displaced with respect to one another whereby rotational movement of the member is required to align the detent with the selected step.

5. The device of claim 4 wherein the detent comprises diametrically oppositely disposed projections from the member, and the steps comprise paired diametrically oppositely disposed bore projections complementary with said detent projections, said axially spaced paired step projections being arcuately displaced with respect to the paired steps axially spaced therefrom.

6. The device of claim 5 wherein the respective axially spaced steps are connected by guide ways contactable with the side margins of the detents in the course of the member's axial and rotational movement between selected stepped positions.

7. In a fishing bobber the combination with a float having a bore and an internal counter bore providing a spring chamber, a compression spring housed within the chamber, a stem in said bore and counterbore, said stem projecting from the float at one end of the bore and provided within the chamber with a fitting extending through said spring and terminating in a hook normally completely retracted within the other end of said bore and reciprocable to an exposed position outside of said bore upon the manipulation of said stem, said bore being provided with a stepped thrust block having shouldered portions at different levels longitudinally of the bore, said spring being so disposed respecting the stem as to normally retract said hook into said bore and oppose manipulation of the stem to project the hook from the bore, said stem being provided with a detent selectively engageable with the shouldered portions of the stepped thrust block whereby the extent of retraction of the hook into the bore is limited dependent upon selected detent engagement with the respective shoulders.

8. The device of claim 7 wherein the respective shouldered portions of the stepped thrust block are arcuately displaced one from the other and separated by axially extending guide ways whereby rotational displacement of the stem detent from its engaged shoulder is arcuately restrained.

9. In a fishing bobber the combination with a float having an axial bore and a line engaging member reciprocable in the bore, of an axially extending guide way having axially and laterally extending guide surfaces in the bore and a detent on the member axially movable in the guide way and against said surfaces whereby rotational movement of said member is restrained.

10. The device of claim 9 wherein the bore is provided with a plurality of arcuately spaced axially extending guide ways, said detent being selectively engageable with any of said plurality.

11. The device of claim 10 wherein the guide ways comprise ribs extending into the bore, said detent being guided between said ribs.

FRANK D. MATRAS.

No references cited.